US008926084B2

(12) United States Patent
Hiraoka

(10) Patent No.: US 8,926,084 B2
(45) Date of Patent: Jan. 6, 2015

(54) POLYMERIZABLE INK COMPOSITION, INK CARTRIDGE CONTAINING THE SAME, AND INKJET PRINTER

(71) Applicant: Takao Hiraoka, Kanagawa (JP)

(72) Inventor: Takao Hiraoka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/083,651

(22) Filed: Nov. 19, 2013

(65) Prior Publication Data

US 2014/0139597 A1    May 22, 2014

(30) Foreign Application Priority Data

Nov. 22, 2012    (JP) .................. 2012-255915

(51) Int. Cl.
| | | |
|---|---|---|
| G01D 11/00 | (2006.01) | |
| B41J 2/175 | (2006.01) | |
| C09D 11/38 | (2014.01) | |

(52) U.S. Cl.
CPC ............. C09D 11/38 (2013.01); B41J 2/17503 (2013.01)
USPC ............................................ 347/100; 347/86

(58) Field of Classification Search
USPC ............................... 347/86, 100; 522/181, 184
See application file for complete search history.

(56) References Cited

U.S. PATENT DOCUMENTS

| | | | | |
|---|---|---|---|---|
| 7,018,774 | B2 * | 3/2006 | Aoai et al. ................. | 430/270.1 |
| 7,141,358 | B2 * | 11/2006 | Nagase ......................... | 430/331 |
| 8,642,680 | B2 * | 2/2014 | Yokoi ............................ | 523/160 |
| 2012/0086762 | A1 | 4/2012 | Noguchi et al. | |
| 2012/0147103 | A1 | 6/2012 | Hasegawa et al. | |
| 2012/0176456 | A1 | 7/2012 | Maekawa et al. | |
| 2012/0200648 | A1 | 8/2012 | Hiraoka et al. | |
| 2012/0242768 | A1 | 9/2012 | Seno et al. | |
| 2012/0293589 | A1 | 11/2012 | Hiraoka | |
| 2013/0065024 | A1 | 3/2013 | Aruga et al. | |

FOREIGN PATENT DOCUMENTS

| | | |
|---|---|---|
| JP | 9-183927 | 7/1997 |
| JP | 2004-526820 | 9/2004 |
| JP | 2005-532445 | 10/2005 |
| JP | 2007-231230 | 9/2007 |
| JP | 2007-231232 | 9/2007 |
| JP | 2008-068516 | 3/2008 |
| JP | 2008-507598 | 3/2008 |
| JP | 2009-062541 | 3/2009 |
| JP | 2009-272609 | 11/2009 |
| JP | 2010-509426 | 3/2010 |
| JP | 2010-530922 | 9/2010 |
| JP | 2012-251123 | 12/2012 |
| JP | 2013-040280 | 2/2013 |
| WO | WO02/061001 A1 | 8/2002 |
| WO | WO2004/005412 A2 | 1/2004 |
| WO | WO2006/085992 A2 | 8/2006 |
| WO | WO2008/056172 A1 | 5/2008 |
| WO | WO2008/157836 A2 | 12/2008 |

OTHER PUBLICATIONS

U.S. Appl. No. 13/900,803, filed May 23, 2013.
"Current Status and Novel Methodology for Detecting Skin Sensitization potential of Chemicals" reported in Functional Materials, vol. 25, No. 9 (Sep. 2005) by Masahiro Takeyoshi of Chemicals Evaluation and Research Institute, Japan.

* cited by examiner

*Primary Examiner* — Anh T.N. Vo
(74) *Attorney, Agent, or Firm* — Cooper & Dunham LLP

(57) ABSTRACT

A polymerizable ink composition contains polymerizable monomers containing at least one of an acrylic acid ester compound, a methacrylic acid ester compound, an acryl amide, and a methacryl amide; and a vinyl ether compound; and one of potassium oxide and sodium oxide.

11 Claims, 2 Drawing Sheets

POLYMERIZABLE INK COMPOSITION, INK CARTRIDGE CONTAINING THE SAME, AND INKJET PRINTER

CROSS-REFERENCE TO RELATED APPLICATIONS

This patent application is based on and claims priority pursuant to 35 U.S.C. §119 to Japanese Patent Application No, 2012-255915, filed on Nov. 22, 2012, in the Japan Patent Office, the entire disclosure of which is hereby incorporated by reference herein.

BACKGROUND

1. Technical Field

The present invention relates to a polymerizable ink composition, an ink cartridge containing the polymerizable ink composition, and an inkjet printer.

2. Background Art

In the field of inkjet printing, the field of industrial inkjet printing in particular, curable inkjet ink has been diffusing in terms of quick-drying, wide variety of printing substrates (recording media), and being free from volatile organic compounds (VOC).

Curable inkjet ink contains unsaturated organic compounds polymerized by, for example, exposure to electron beams or ultraviolet ray under the presence of a photopolymerization initiator. Such curable inkjet ink produces radicals upon irradiation of energy and the unsaturated organic compounds come to have high molecular weights by the radical reaction. As a result, the ink is fixed by curing or solidification. This reaction instantly proceeds upon irradiation of energy, which results in quick drying.

In addition, since curable inkjet ink is solidified immediately, the ink can be printed on a non-ink absorbing print substrate (recording medium) that does not absorb ink such as metal, glass, china and porcelain, ceramics, or plastic film without degradation of the quality of image, resulting in a wide selection of print substrates.

Furthermore, since the entire of the unsaturated organic compounds become large polymers, the printing process using this ink is VOC-free.

As the unsaturated organic compound (hereinafter referred to as monomer) of curable inkjet ink, (meth)acrylic acid ester compounds are used in general. Most of such (meth)acrylic acid ester compounds are viscous. Typically, ink using a multi-functional (meth)acrylic acid ester compound having a number of polymerizable functional groups has a high cross-linking density and forms images hard to remove. However, the ink tends to be highly viscous, which makes it difficult to overcome a trade-off between lowering the viscosity of a curable inkjet ink and improving the curing property thereof.

In attempts to solve this problem, JP-2010-509426-A discloses a curable inkjet composition that can prevent curing inhibition caused by oxygen and improve attachability by adding a monomer having an epoxy group cured by a cation, a cationic photopolymezation initiator, and water.

JP-2008-507598-A discloses ink that can form high definition images at high speed because the curing speed thereof is improved by setting each content of an unsaturated ethylene mono-functional monomer, an unsaturated ethylene di-valent monomer, an unsaturated ethylene multi-valent monomer, and a urethane ethylene oligomer in particular ranges.

JP-2009-272609-A discloses a curable composition that contains a compound having a methacroyl group or acroyl group that is able to prevent clogging of nozzles caused by curing of ink, a compound having a thermocuring functional group such as a hydroxyl group or a carboxylic group, and a dilution agent such as a vinyl ether or an ethylene derivative.

JP-2010-530922-A discloses ultraviolet ray curable ink that improves attachability to polypropylene or a non-porous substrate having a low surface tension by adding a monoacrylate having a glass transition temperature Tg to improve the flexibility of ink layers.

JP-2007-231230-A, JP-2007-231232-A, and JP-2008-68516-A disclose ink compositions that improve the attachability between a recording medium and ink by adding an ester or amide of (meth)acrylic acid, a vinyl ether having a hydrocarbon group, and a polymerization initiator.

JP-3672651-B1 (JP-H09-183927-A) discloses an ultraviolet ray curing resin composition for inkjet recording that forms images on paper or a plastic substrate without forming a resin layer for attachment by setting the mass ratio among a (meth)acrylate compound, a vinyl ether compound, and a photopolymerization initiator in a particular range.

JP-2009-62541-A, JP-2005-532445-A, and JP-2004-526820-A disclose ink having a quick curing speed and a low viscosity, which can be obtained by using $\alpha,\beta$-unsaturated ether together with a (meth)acrylate monomer.

In general, most of (meth)acrylic acid ester compounds are toxic potential about skin sensitization that cause an allergy by touching (one of reaction of delayed hypersensitivity that causes irritated skin by excessive immune reaction to a chemical material). That is, if non-cured monomer compositions remain on a printed matter, it may cause an allergy by touching with a finger or a hand. For this reason, ink that forms safe printed matters without causing an allergy is desired.

However, as described above, in addition to the trade-off between lowering the viscosity of a curable inkjet ink and improving the curing property thereof, manufacturing ink having no or little skin sensitization problem is extremely difficult. In fact, the skin sensitization problem is not considered in the patent documents mentioned above.

In an attempt to solve this problem, JP-2012-251123-A discloses a photopolymerizable inkjet ink containing a (meth) acrylate and/or a (meth)acrylamide, and a vinyl ether compound, which has an excellent curing property and a low viscosity without skin sensitization. Although this is successful to some degree, the storage stability thereof is not found to be satisfactory.

Furthermore, 2013-040280-A discloses an addition of water or a tertiary amine compound to improve storage stability.

SUMMARY

The present invention provides an improved polymerizable ink composition contains polymerizable monomers containing at least one of an acrylic acid ester compound, a methacrylic acid ester compound, an acryl amide, and a methacryl amide; and a vinyl ether compound; and one of potassium oxide and sodium oxide.

DETAILED DESCRIPTION

Figure 1:
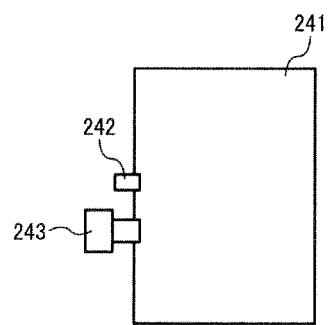
FIG. 1 is a schematic diagram illustrating an example of the ink bag of an ink cartridge according to an embodiment of the present disclosure.

JP-2012-251123-A discloses a photopolymerizable inkjet ink containing a (meth)acrylate and/or a (meth)acrylamide, which has an excellent curing property and a low viscosity without skin sensitization. Although this is successful to some degree, the storage stability thereof is not found to be satisfactory.

As a result of an investigation made by the present inventor to improve the storage stability of this ink, it has been found that the storage stability is not improved by just using (adding) a conventionally and widely used radical polymerization inhibitor, for example, phenol quinone compound such as hydroquinone and methoquinone as a polymerization initiator for optical polymerizable inkjet ink containing a (meth) acrylate compound.

Furthermore, JP-2013-040280-A discloses an addition of water or a tertiary amine compound to improve storage stability. The storage stability was evaluated under the acceleration test conditions at 70° C. for 4 days and the result was no change of appearance.

Moreover, the present inventor has found that, instead of or in addition to these materials, the storage stability of the polymerizable inkjet ink can be furthermore improved by addition of a strong alkali component In view of the foregoing, the present invention is to improve the photopolymerizable (curable) inkjet ink described in JP-2012-251123-A mentioned above and provide a low viscous polymerizable ink composition having an excellent curability and storage stability while being free from skin sensitization problems.

The polymerizable ink composition of the present disclosure is described in detail.

The polymerizable ink composition of the present disclosure contains at least a polymerizable monomer. The polymerizable monomer is at least one of an acrylic acid ester compound, a methacrylic acid ester compound, an acryl amide, and a methacryl amide; and a vinyl ether compound. The polymerizable monomer also contains a strong alkali component. At least one of the at least one of an acrylic acid ester compound, a methacrylic acid ester compound, an acryl amide, and a methacryl amide preferably has 1 to 6 functional groups.

As the (meth)acrylic acid ester compound or the (meth) acryl amide compound, known compounds can be used. It is preferable to use a compound having a Stimulation Index (SI) of less than 3, which indicates the degree of sensitivity as measured by a skin sensitization test according to Local Lymph Node Assay (LLNA) Method.

The skin sensitization test of LLNA method is defined in OECD test guideline 429. For example, if the SI values is less than 3, no skin sensitization problem occurs as shown in "Function and Materials" (published in September, 2005, Vol. 25, No. 9, P55-P64). In the material safety data sheet (MSDS), a material evaluated as no skin sensitization or negative naturally has an SI value less than 3. Therefore, such a material has considered to be free from such a skin sensitization problem.

The polymerizable ink composition of the present disclosure preferably contains a polymerizable monomer having an SI value of less than 3, which makes this polymerizable ink composition safe with regard to skin sensitization. If this is the case, a non-cured monomer component that remains on a printed matter does not cause an allergy when it is touched by a finger. That is, a safe printed matter is provided.

Specific examples of (meth)acrylic acid ester compounds or (meth)acryl amide compounds easily and economically available on market and free from the skin sensitization problem include, but are not limited to, polyethylene glycol dimethacrylate represented by a chemical formula 1:

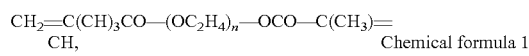

(n is from 9 to 14, where n represents an average polymerization degree), γ-butylolactone methacrylate, trimethylol propane trimethacrylate, tricyclodecane dimethanol dimethacrylate, caprolactone-modified dipenta erythritol hexaacrylate, polypropylene glycol diacrylate represented by the following chemical formula 2,

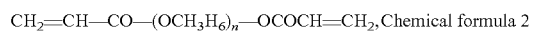

a diacrylate of caprolactone modified hydroxy pivalic acid neopentyl glycol ester represented by the following chemical formula A:

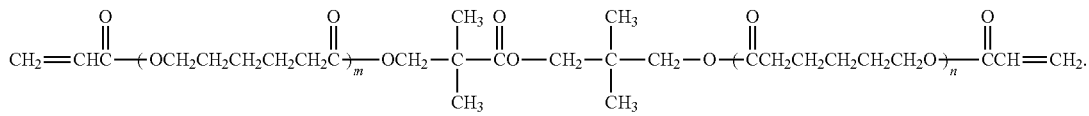

where m and n represent average polymerization degrees and m+n=4, polyethoxylated tetramethylol methane tetraacrylate, ethylene oxide-modified bisphenol A diavrylate, neopentyl glycol dimethacrylate, stearyl acrylate, 1,4-butane diol dimethacrylate, and hydroxyethyl acryl amide.

In addition, the following (meth)acrylates or (meth)acryi amides can be used in combination unless causing a problem as ink although these are not suitable more or less about skin sensitization.

Specific examples of (meth)acrylate and (meth)acryi amide that can be used in combination with (meth)acrylates or (meth)acryi amides free from the skin sensitization problem include, but are not limited to, ethylene glycol (meth) acrylate, hydroxy pivalic acid neopentyl glycol di(meth)acrylate, γ-butylolactone acrylate, isobornyl(meth)acrylate, formalized trimethylol propane mono(meth)acrylate, polytetramethylene glycol di(meth)acrylate, trimethylol propane (meth)acrylic acid salicylic acid ester, diethylene glycol di(meth)acrylate, triethylene glycol di(meth)acrylate, tetraethylene glycol di(meth)acrylate, polyethylene glycol diacrylate [$(CH_2=CH-CO-(OC_2H_4)n-OCOCH=CH_2$ (n=4)], polyethylene glycol diacrylate [$(CH_2=CH-CO-(OC_2H_4)_n-OCOCH=CH_2$ (n=9)], polyethylene glycol diacrylate [$(CH_2=CH-CO-(OC_2H_4)_n-OCOCH=CH_2$ (n=14)], polyethylene glycol diacrylate [$(CH_2=CH-CO-(OC_2H_4)_n-OCOCH=CH_2$ (n=23)], dipropylene glycol di(meth)acrylate, dipropylene glycol di(meth)acrylate, polypropylene glycol dimethacrylate [$(CH_2$=$C(CH_3)$—CO—$(OC_3H_6)_n$—$OCOC(CH_3)$=$CH_2$ (n=7)], 1,3-butane diol di(meth)acrylate, 1,4-butane diol diacrylate, 1,6-hexane diol di(meth)acrylate, 1,9-nonene diol di(meth)acrylate, neopentyl glycol di(meth)acrylate, tricyclodecane dimethanol diacrylate, di(meth)acrylate of an adduct of bisphenol A with propylene oxide, 1,6-hexane diol di(meth)acrylate, polyethylene glycol di(meth)acrylate, dipenta erythritol hexa(meth)acrylate, methacryloyl morphorine, 2-hydroxyethyl methacryl amide, ethylene oxide-modified tetramethylol methane tetramethacrylate, dipentaerythritol hydroxypenta(meth)acrylate, caprolactone-modified dipentaerythritol hydroxy penta(meth)acrylate, ditrimethylol propane tetra(meth)acrylate, pentaerythritol tetra(meth)acrylate, trimethylol propane triacrylate, ethylene oxide-modified trimethylol propane tri(meth)acrylate, propylene oxide-modified trimethylol propane tri(meth)acrylate, caprolactone-modified trimethylol propane tri(meth)acrylate, pentaerythritol tri(meth)acrylate, tris(2-hydroxyethyl)isocyanulate tri(meth)acrylate, neopentyl glycol diacrylate, ethoxylated neopentyl glycol di(meth)acrylate, propoxylated neopentyl glycol di(meth)acrylate, propoxylated glyceryl tri(meth)acrylate, polyester di(meth)acrylate, polyester tri(meth)acrylate, polyester tetra(meth)acrylate, polyeter penta(meth)acrylate, polyester poly(meth)acrylate, vinylcaprolactam, vinyl pyrrolidone, N-vinyl formamide, polyurethane di(meth)acrylate, polyurethanetri(meth)acrylate, polyurethane tetra(meth)acrylate, polyurethane penta(meth)acrylate, polyurethane hexa(meth)acrylate, dimethyl(meth)acryl amide, dimethyl aminopropyl (meth)acryl amide (DMAPAA), isopropyl(meth)acryl amide (NIPAM), and diethyl(meth)acryl amide (DEAA).

A specific example of vinyl ether compound free from skin sensitization is triethylene glycol divinyl ether. Since this vinyl ether compound is low viscous, it is possible to lower the viscosity of ink and improve the curability thereof without skin sensitization in comparison with a case in which no vinyl ether compound is used.

However, as described later, it is preferable to use a photoradical polymerization initiator for the ink composition of the present disclosure. In addition, since a vinyl ether compound is not significantly radical-polymerization reactive, if it is blended excessively to lower the viscosity of ink, curability greatly suffers for lowering the viscosity. Therefore, the content of a vinyl ether compound is preferably from 5% by weight to 60% by weight and more preferably from 30% by weight to 50% by weight in a polyemrizable monomer taking into account the balance between low viscosity and curability.

The polymerizable ink composition of the present disclosure contains a strong alkali component.

The content of the strong alkali component depends on the solubility of potassium oxide or sodium oxide in materials. The content of strong alkali component in ink depends on what kind of a (meth)acrylic acid ester compound or a (meth)acryl amide compound is used and the ratio of an added vinyl ether compound. In terms of the balance between curing speed after energy irradiation and storage property, the content is preferably from 0.0001 parts by weight to 0.5 parts by weight to 100 parts by weight of a polyemrizable monomer and more preferably from 0.001 parts by weight to 0.1 parts by weight.

Not all of polymerizable monomers having SI values of less than 3 dissolves potassium hydroxide or sodium hydroxide quickly. For example, triethylene glycol vinyl ether and (meth)acrylic acid ester compounds or (meth)acryl amide compounds having hydrophillic structure are highly hydrophillic. Therefore, it is efficient to use an aqueous solution of potassium hydroxide or sodium hydroxide in terms of quick dissolution of potassium hydroxide or sodium hydroxide.

In the present disclosure, whether a strong alkali is dissolved or not is determined by visually confirming that the liquid is uniform and transparent in a state in which no coloring agent such as a pigment is contained.

As the polymelization initiator, it is possible to use a photoradical polymerization initiator or a photocation polymerization initiator. It is suitable to use a photoradical polymerization initiator. The reason is as follows: (Meth)acrylic acid ester compounds are generally radical polymerizable and also cation polymerizable but photoacation polymerization initiators are expensive in general and gradually produce strong acids without irradiation of light. For this reason, selection of members contacting ink such as ink supplying paths in a printer is limited. Moreover, although UV-LED has become popular in recent years as an energy-efficient light source, UV-LED available on market is only 365 nm or longer. Unfortunately, (meth)acrylic acid ester compounds are not sufficiently sensitive in such a long frequency range.

Specific examples of photoradical polymerization initiators include, but are not limited to, 2,2-dimethoxy-1,2-diphenylethane-1-one, 1-hydroxy cyclohexyl phenyl ketone, 2-hydroxy-2-methyl-1-phenyl propane-1-one, 1-[4-(2-hydroxyethoxy)-phenyl]-2-hydroxy-2-methyl-1-propane-1-one, 2-hydroxy-1-{4-[4-(2-hydroxy-2-methyl-propionyl)-benzyl]-phenyl}-2-methyl-1-propane-1-one, phenyl glyoxylic acid methyl ester, 2-methyl-1-[4-(methylthio)phenyl]-2-morpholino propane-1-one, 2-benzyl-2-dimethylamino-1-(4-morpholinophenyl)-butanone-1,2-dimethylamino-2-(4-methyl-benzyl)-1-(4-morpholino-4-yl-phenyl) butane-1-one, bis(2,4,6-trimethylbenzoyl)-phenyl phosphine oxide, bis(2,6-dimethoxybenzoyl)-2,4,4-trimethyl-pentyl phosphine oxide, 2,4,6-trimethyl benzoyl-phosphine oxide, 1,2-octane dione-[4-(phenylthio)-2-(o-benzoyloxime], {ethanone, 1-[9-ethyl-6-(2-methyl benzoyl)-9H-carbazole-3-yl]-1-(o-acetyloxime)]}, [4-(methylphenylthio)phenyl] phenyl methanone, benzophenone, methyl benzophenone, methyl-2-benzoyl benzoate, 4-benzoyl-4'-methyldiphenyl sulfide, phenyl benzophenone, 2,4-diethylthioxanthone, 2-chlorothioxanthone, isopropylthioxanthone, and 1-chloro-4-propylthioxanthone. The content of the polymerization initiator is preferably from 1 part by weight to 20 parts by weight to 100 parts of a polyemrizable monomer.

The polymerizable ink composition of the present disclosure contains a conventional radical polymerization inhibitor.

Specific examples of such radical polymerization inhibitors include, but are not limited to, 4-methoxy-1-naphthol, methyl hydroquinone, hydroquinone, t-butyl hydroquinone, methoquinone, di-t-butyl hydroquinone, 2,2'-dihydroxy-3,3'-di(α-methylcyclohexyl)-5,5'-dimethyldiphenyl methane, p-banzoquinone, 9,10-di-n-buthoxy anthracene, and 4,4'-[1,10-dioxo-1,10-decane diylbis(oxy)]bis[2,2,6,6-tetramethyl]-1-piperidinyloxy.

The polymerizable ink composition of the present disclosure may contain a coloring agent. Any known inorganic pigment or organic pigment can be used. Carbon black manufactured by a furnace method or a channel method can be used as a black pigment.

Specific examples of the white pigments include, but are not limited to, sulfates of alkali earth metals such as barium sulfide, carbonates of alkali earth metals such as calcium carbonates, silicas such as fine powder of silicic acid and synthetic silicate, calcium silicate, alumina, hydrated alumina, titanium oxide, zinc oxide, talc, and clay.

Pigment Yellow pigments can be used as yellow pigments.

Specific examples thereof include, but are not limited to, Pigment Yellow 1, Pigment Yellow 2, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 75, Pigment Yellow 83, Pigment Yellow 93, Pigment Yellow 95, Pigment Yellow 97, Pigment Yellow 98, Pigment Yellow 114, Pigment Yellow 120, Pigment Yellow 128, Pigment Yellow 129, Pigment Yellow 138, Pigment Yellow 150, Pigment Yellow 151, Pigment Yellow 154, Pigment Yellow 155, and Pigment Yellow 180.

Pigment Red pigments can be used as magenta pigments.

Specific examples thereof include, but are not limited to, Pigment Red 5, Pigment Red 7, Pigment Red 12, Pigment Red 48 (Ca), Pigment Red 48(Mn), Pigment Red 57 (Ca), Pigment Red 57:1, Pigment Red 112, Pigment Red 122, Pigment Red 123, Pigment Red 168, Pigment Red 184, Pigment Red 202, and Pigment Violet 19.

Pigment Blue pigments can be used as cyan pigments.

Specific examples thereof include, but are not limited to, Pigment Blue 1, Pigment Blue 2, Pigment Blue 3, Pigment Blue 15, Pigment Blue 15:3, Pigment Blue 15:4. Pigment Blue 16, Pigment Blue 22, Pigment Blue 60, Pat Blue 4, and Pat Blue 60.

Considering properties, other inorganic pigments and organic pigments can be suitably used.

The polymerizable ink composition of the present disclosure preferably has a viscosity of 3 mPa·s to 200 mPa·s at 25° C. However, there are inkjet discharging heads available on market (for example, GEN4, manufactured by Ricoh industry Company Ltd.) which can be heated to 60° C. and discharged under 20 mPa·s or less. Therefore, it is not necessary that the viscosity is within this range if the viscosity is lowered sufficiently by heating.

The polymerizable ink composition of the present disclosure can be applied by, for example, spray coating. Also, the polymerizable ink composition of the present disclosure can be applied to an inkjet apparatus (inkjet printer), etc.

Ink using the ink composition of the present disclosure can be accommodated in a container for an ink cartridge. Due to such an ink cartridge, there is no need to directly touch ink during operations such as ink change, which makes users free from concerns of contamination on fingers and clothes and also prevents foreign objects such as dust from mingling into ink.

There is no specific limit to the container. Any form, any structure, any size, and any material can be suitably selected. For example, a container having an ink bag formed of aluminum laminate film, a resin film, etc. can be suitably used.

Next, the ink cartridge is described in detail with reference to FIGS. 1 and 2. FIG. 1 is a schematic diagram illustrating an example of an ink bag 241 in the ink cartridge of the present disclosure and FIG. 2 is a schematic diagram illustrating an ink cartridge 200 that accommodates the ink bag 241 of FIG. 1 in a cartridge housing 244.

As illustrated in FIG. 1, after the ink bag 241 is filled with ink from an ink inlet 242 and the air remaining in the ink bag 241 is discharged, the ink inlet 242 is closed by fusion. When in use, the ink is supplied by piercing the needle provided to the inkjet recording device into an ink outlet (243) made of rubber. The ink bag 241 is formed of a packaging material such as aluminum laminate film having no air permeability.

Figure 2:
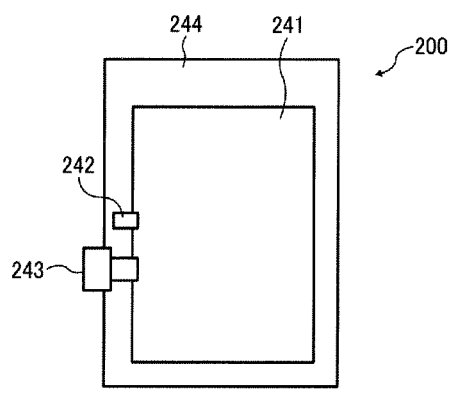
FIG. 2 is a schematic diagram illustrating an example of the ink cartridge according to an embodiment of the present disclosure in which the ink bag of FIG. 1 is accommodated.

As illustrated in FIG. 2, the ink bag 241 is accommodated in the cartridge housing 244 made of plastic. Theses are detachably attached to the inkjet recording apparatus as the ink cartridge 200.

It is particularly preferable that the ink cartridge of the present disclosure is detachably attachable to the inkjet recording device of the present disclosure. By using the ink cartridge, replenishing and exchanging ink is simplified, thereby improving the workability.

Figure 3:
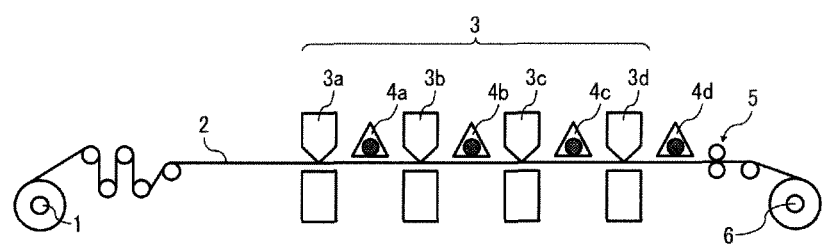
FIG. 3 is a schematic diagram illustrating an example of an inkjet recording device (printer) according to an embodiment of the present disclosure.

FIG. 3 is a schematic diagram illustrating an example of an inkjet recording device (printing apparatus) related to the present disclosure. The inkjet printing device (inkjet printer) includes a printing unit and a radiation source irradiation unit. The configuration and form of the printing apparatus is not limited to this embodiment.

FIG. 3 is a diagram illustrating an example in which color images are formed by a printing unit 3 (3a, 3b, 3c and 3d of each color, for example, yellow, magenta, cyan, and black) from which each color ink is ejected onto a print substrate (recording medium) 2 fed from a print substrate supplying roll 1 followed by irradiation of UV ray emitted from ultraviolet ray light sources (radiation source irradiation units for curing) 4a, 4b, 4c, and 4d for each print. The recording medium 2 is transferred from left to right in FIG. 3. The reference numeral 6 represents a printed matter reeling roll.

The printing unit 3a, 3b, 3c and 3d optionally have heating mechanisms at ink discharging portions to lower the viscosity of ink. For workability after printing, a processing unit 5 can be optionally provided to proceed working such as perforation, marginal punch holes, filing punch holes, and corner cutting.

The recording medium 2 is formed of paper, film, metal, or mixtures thereof. In addition, although the recording medium 2 has a roll form in FIG. 3, a sheet form is also suitable Also, duplex printing is possible. Curability is improved by irradiation of ultraviolet ray whenever each color is printed for high speed performance. On the other hand, the power of the ultra violet ray light sources 4a, 4b, and 4c is weakened or zero and multiple colors are irradiated and cured by the ultra violet ray light source 4d after some or all of the colors are printed to lower the cost and save energy.

Having generally described preferred embodiments of this invention, further understanding can be obtained by reference to certain specific examples, which are provided herein for the purpose of illustration only and are not intended to be limiting. In the descriptions in the following examples, the numbers in parts represent weight ratios in parts unless otherwise specified.

EXAMPLES

The present invention is described in detail with reference to the Examples but not limited to the following Examples.

Comparative Example 1

Ink composition of Comparative Example 1 was obtained by mixing the following materials.

| | |
|---|---|
| Dipentaerythritol penta/hexaacrylate (M-405, manufactured by Toagosei Company, Limited, no skin sensitization data): | 20 parts. |
| Trimethylol propane triacrylate (M-309, manufactured by Toagosei Company, Limited, skin sensitization causing material mentioned in MSDS): | 10 parts |
| Propylene oxide modified neopentyl glycol diacrylate (SR9003, manufactured by Sartomer Company Inc., SI value: 3.7): | 20 parts |
| Neopentyl glycol dimethacrylate (NPG, manufactured by Shin-Nakamura Chemical Co., Ltd., SI value: 2.0): | 10 parts |
| Triethylene glycol divinylether (DVE3, manufactured by BASF, no skin sensitization mentioned in MSDS): | 40 parts |

| | |
|---|---|
| Photoradical polymerization initiator (2-dimmethylamino-2-(4-methyl-benzyl)-1-(4-morpholine-4-yl-phenyl)butane-1-one) (no skin sensitization mentioned in MSDS): | 10 parts |
| Radical polymerization inhibitor (t-butyl hydroquinone): | 0.1 parts |

Comparative Example 2

Ink composition of Comparative Example 2 was prepared in the same manner as in Comparative Example 1 except that 1 part by weight of N-methyl diethanol amine was added to the ink composition of Comparative Example 1.

Comparative Example 3

Ink composition of Comparative Example 3 was prepared in the same manner as in Comparative Example 1 except that 2 part by weight of N-methyl diethanol amine was added to the ink composition of Comparative Example 1.

Comparative Example 4

Ink composition of Comparative Example 4 was prepared in the same manner as in Comparative Example 1 except that 5 part by weight of N-methyl diethanol amine was added to the ink composition of Comparative Example 1.

Example 1

Ink composition of Example 1 was prepared in the same manner as in Comparative Example 1 except that 1 part by weight of 1 mol/l of aqueous solution of potassium hydroxide (0.03 parts by weight as potassium hydroxide) was added to the ink composition of Comparative Example 0.5.

Example 2

Ink composition of Example 2 was prepared in the same manner as in Comparative Example 1 except that 1 part by weight of 1 mol/l of aqueous solution of potassium hydroxide (0.06 parts by weight as potassium hydroxide) was added to the ink composition of Comparative Example 1.

Example 3

Ink composition of Example 3 was prepared in the same manner as in Comparative Example 1 except that 0.5 parts by weight of 1 mol/l of aqueous solution of sodium hydroxide (0.02 parts by weight as sodium hydroxide) was added to the ink composition of Comparative Example 1.

Example 4

Ink composition of Example 4 was prepared in the same manner as in Comparative Example 1 except that 1 parts by weight of 1 mol/l of aqueous solution of sodium hydroxide (0.04 parts by weight as sodium hydroxide) was added to the ink composition of Comparative Example 1.

Example 5

Ink composition of Example 5 was prepared in the same manner as in Example 1 except that 1 part by weight of N-methyl diethanol amine was added to the ink composition of Example 1.

Example 6

Ink composition of Example 6 was prepared in the same manner as in Example 2 except that 1 part by weight of N-methyl diethanol amine was added to the ink composition of Example 2.

Example 7

Ink composition of Example 7 was prepared in the same manner as in Example 3 except that 1 part by weight of N-methyl diethanol amine was added to the ink composition of Example 3.

Example 8

Ink composition of Example 8 was prepared in the same manner as in Example 4 except that 1 part by weight of N-methyl diethanol amine was added to the ink composition of Example 4.

Comparative Example 5

Ink composition of Comparative Example 5 was obtained by mixing the following materials.

| | |
|---|---|
| Caprolactone modified dipentaerythritol hexaacrylate (DPCA 60, manufactured by Nippon Kayaku Co., Ltd., Negative in MSDS): | 20 parts |
| Ethylene oxide-modified bisphenol A diacrylate (BPE10, manufactured by DAI-ICHI KOGYO SEIYAKU CO., LTD., SI value = 1.2): | 10 parts |
| Polyethoxylated tetramethylol methane tetraacrylate (ATM35E, manufactured by Shin-Nakamura Chemical Co., Ltd., SI Value = 1.7): | 5 parts |
| Diacrylate of caprolactone-modified hydroxy pivalic acid neopentyl glyco (HX620, manufactured by Nippon Kayaku Co., Ltd., SI Value = 0.9): | 5 parts |
| Hydroxyethyl acrylic amide (HEAA, manufactured by Kohjin Holdings Co., Ltd., No skin sensitization in MSDS): | 2 parts |
| Polypropylene glycol (n = 12) diacrylate (M-270, manufactured by Toagosei Company, Limited, SI value = 1.5): | 5 parts |
| Polyethylene glycol (n = 14) dimethacrylate (Light Ester 14EG, manufactured by Kyoeisha Chemical Co. LTD., SI value: 1.6): | 1 part |
| Polyethylene glycol (n = 9) dimethacrylate (Light Ester 9EG, manufactured by Kyoeisha Chemical Co. LTD., SI value: 1.3): | 1 part |
| Trimethylol propane triacrylate (SR-350, manufactured by Sartomer Company Inc., SI value 1.9): | 2 parts |
| γ-butyloactone methacrylate (GBLMA, manufactured by OSAKA ORGANIC CHEMICAL INDUSTRY LTD., SI value: 2.1): | 1 part |
| Staryl acrylate (STA, manufactured by OSAKA ORGANIC CHEMICAL INDUSTRY LTD., SI value: 2.7): | 2 parts |
| Neopentyl glycol dimethacrylate (NPG, manufactured by Shin-Nakamura Chemical Co., Ltd., SI value: 2.0): | 2 parts |
| 1,4-butane diol dimethacrylate (SR214, manufactured by Sartomer Company Inc.: SI value = 2.6): | 2 parts |
| Tricyclodecane dimethanol dimethacrylate (DCP, manufactured by Shin-Nakamura Chemical Co., Ltd., SI value: 1.3): | 2 parts |
| Triethylene glycol divinylether (DVE3, manufactured by BASF, no skin sensitization mentioned in MSDS): | 40 parts |
| Photoradical polymerization initiator (2-dimmethylamino-2-(4-methyl-benzyl)-1-(4-morpholine-4-yl-phenyl)butane-1-one) (no skin sensitization mentioned in MSDS): | 10 parts |
| Radical polymerization inhibitor (t-butyl hydroquinone): | 0.1 parts |

Comparative Example 6

Ink composition of Comparative Example 6 was prepared in the same manner as in Comparative Example 5 except that 1 part by weight of N-methyl diethanol amine was added to the ink composition of Comparative Example 5.

Comparative Example 7

Ink composition of Comparative Example 7 was prepared in the same manner as in Comparative Example 5 except that 2 part by weight of N-methyl diethanol amine was added to the ink composition of Comparative Example 5.

Comparative Example 8

Ink composition of Comparative Example 8 was prepared in the same manner as in Comparative Example 5 except that 5 part by weight of N-methyl diethanol amine was added to the ink composition of Comparative Example 5.

Example 9

Ink composition of Example 9 was prepared in the same manner as in Comparative Example 1 except that 5 part by weight of 1 mol/l of aqueous solution of potassium hydroxide (0.03 parts by weight as potassium hydroxide) was added to the ink composition of Comparative Example 0.5.

Example 10

Ink composition of Example 10 was prepared in the same manner as in Comparative Example 5 except that 1 part by weight of 1 mol/l of aqueous solution of potassium hydroxide (0.06 parts by weight as potassium hydroxide) were added to the ink of Comparative Example 5.

Example 11

Ink composition of Example 11 was prepared in the same manner as in Comparative Example 5 except that 0.5 parts by weight of 1 mol/l of aqueous solution of sodium hydroxide (0.02 parts by weight as sodium hydroxide) was added to the ink composition of Comparative Example 0.5.

Example 12

Ink composition of Example 12 was prepared in the same manner as in Comparative Example 5 except that 1 part by weight of 1 mol/l of aqueous solution of sodium hydroxide (0.04 parts by weight as sodium hydroxide) were added to the ink of Comparative Example 5.

Example 13

Ink composition of Example 13 was prepared in the same manner as in Example 9 except that 1 part by weight of N-methyl diethanol amine was added to the ink composition of Example 11.

Example 14

Ink composition of Example 14 was prepared in the same manner as in Example 10 except that 1 part by weight of N-methyl diethanol amine was added to the ink composition of Example 10.

Example 15

Ink composition of Example 15 was prepared in the same manner as in Example 11 except that 1 part by weight of N-methyl diethanol amine was added to the ink composition of Example 11.

Example 16

Ink composition of Example 16 was prepared in the same manner as in Example 12 except that 1 part by weight of N-methyl diethanol amine was added to the ink composition of Example 12.

The ink composition prepared as described above was sealed in a sample bottle, heated to 70° C., and left for 14 days as an acceleration test. Storage stability was evaluated by confirming the viscosity change from the initial state. Viscosity was measured by a cone plate type rotation viscosity meter manufactured by TOKI SANGYO CO., LTD. The constant temperature circulation water was set to 25° C. and the viscosity change (%) from the initial state was shown. The smaller the viscosity change, the better the storage stability.

The evaluation results are shown in Tables 1 and 2.

TABLE 1

|  | Alkali component (parts by weight) | Storage stability (viscosity change) |
| --- | --- | --- |
| Comparative Example 1 | None | Gel. Unable to measure viscosity |
| Comparative Example 2 | N-methyl diethanol amine (1) | +20% |
| Comparative Example 3 | N-methyl diethanol amine (2) | +16% |
| Comparative Example 4 | N-methyl diethanol amine (5) | +9.0% |
| Example 1 | 1 mol/L of potassium hydroxide (0.5) | +1.5% |
| Example 2 | 1 mol/L of potassium hydroxide (1) | +1.2% |
| Example 3 | 1 mol/L of sodium hydroxide (0.5) | +1.8% |
| Example 4 | 1 mol/L of sodium hydroxide (1) | +1.4% |
| Example 5 | N-methyl diethanol amine (1) 1 mol/L of potassium hydroxide (0.5) | +1.0% |
| Example 6 | N-methyl diethanol amine (1) 1 mol/L of potassium hydroxide (1) | +0.6% |
| Example 7 | N-methyl diethanol amine (1) 1 mol/L of sodium hydroxide (0.5) | +1.2% |
| Example 8 | N-methyl diethanol amine (1) 1 mol/L of sodium hydroxide (1) | +0.8% |

TABLE 2

|  | Alkali component (parts by weight) | Storage stability (viscosity change) |
| --- | --- | --- |
| Comparative Example 5 | None | Gel. Unable to measure viscosity |
| Comparative Example 6 | N-methyl diethanol amine (1) | +15% |
| Comparative Example 7 | N-methyl diethanol amine (2) | +10% |
| Comparative Example 8 | N-methyl diethanol amine (5) | +8.0% |
| Example 9 | 1 mol/L of potassium hydroxide (0.5) | +1.1% |

TABLE 2-continued

| | Alkali component (parts by weight) | Storage stability (viscosity change) |
|---|---|---|
| Example 10 | 1 mol/L of potassium hydroxide (1) | +0.9% |
| Example 11 | 1 mol/L of sodium hydroxide (0.5) | +1.2% |
| Example 12 | 1 mol/L of sodium hydroxide (1) | +0.8% |
| Example 13 | N-methyl diethanol amine (1) 1 mol/L of potassium hydroxide (0.5) | +1.0% |
| Example 14 | N-methyl diethanol amine (1) 1 mol/L of potassium hydroxide (1) | +0.2% |
| Example 15 | N-methyl diethanol amine (1) 1 mol/L of sodium hydroxide (0.5) | +0.9% |
| Example 16 | N-methyl diethanol amine (1) 1 mol/L of sodium hydroxide (1) | +0.2% |

As seen in the results of Examples, according to the present disclosure, a low viscous polymerizable ink composition is provided which has excellent curability and excellent storage stability while being free from skin sensitization problems.

Having now fully described embodiments of the present invention, it will be apparent to one of ordinary skill in the art that many changes and modifications can be made thereto without departing from the spirit and scope of embodiments of the invention as set forth herein.

What is claimed is:

1. A polymerizable ink composition comprising:
polymerizable monomers comprising:
at least one of an acrylic acid ester compound, a methacrylic acid ester compound, an acryl amide, and a methacryl amide; and
a vinyl ether compound; and
one of potassium oxide and sodium oxide.

2. The polymerizable ink composition according to claim 1, further comprising water.

3. The polymerizable ink composition according to claim 1, further comprising N-methyl diethanol amine.

4. The polymerizable ink composition according to claim 1, wherein at least one of the at least one of an acrylic acid ester compound, a methacrylic acid ester compound, an acryl amide, and a methacryl amide comprises 1 to 6 functional groups.

5. The polymerizable ink composition according to claim 1, wherein the polymerizable monomer has a Stimulation Index (SI) of less than 3 as measured by a skin sensitization test by Local Lymph Node Assay (LLNA) Method.

6. The polymerizable ink composition according to claim 5, wherein the polymerizable monomer having an SI value of less than 3 is at least one of: polyethylene glycol dimethacrylate represented by a chemical formula 1: $CH_2=C(CH_3)CO-(OC_2H_4)_n-OCO-C(CH_3)=CH_2$ (where n=9 to 14, where n represents an average polymerization degree), γ-butylolactone methacrylate, trimethylol propane trimethacrylate, tricyclodecane dimethanol dimethacrylate, caprolactone modified dipenta erythritol hexaacrylate, polypropylene glycol diacrylate represented by a chemical formula 2: $CH_2=CH-CO-(OCH_3H_6)_n-OCOCH=CH_2$ (n=12, where n represents an average polymerization degree), diacrylate of caprolactone-modified hydroxy pivalic acid neopentyl glycol ester represented by the following chemical relation A:

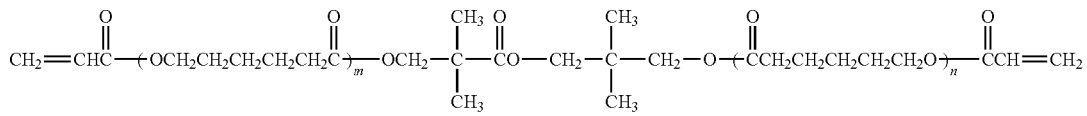

where m and n represent average polymerization degree and m+n=4, polyethoxylated tetramethylol methane tetraacrylate, ethylene oxide-modified bisphenol A diacrylate, neopentyl glycol dimethacrylate, stearyl acrylate, 1,4-butane diol dimethacrylate, and hydroxyethyl acrylamide.

7. The polymerizable ink composition according to claim 1, wherein the vinyl ether compound is triethylene glycol divinyl ether.

8. The polymerizable ink composition according to claim 1, further comprising a photoradical polymerization initiator.

9. An ink cartridge comprising:
a container; and
the polymerizable ink composition of claim 1 that is accommodated in the container.

10. An inkjet printer comprising:
a printing unit comprising:
the polymerizable ink composition of claim 1; and
a radiation source irradiation unit.

11. An inkjet printer comprising:
a printing unit; and
a radiation source irradiation unit,
wherein the ink cartridge of claim 9 is installed in the inkjet printer.

* * * * *